R. BRYSON.
Harvester.
No. 38,030.
2 Sheets—Sheet 1.
Patented March 31, 1863.
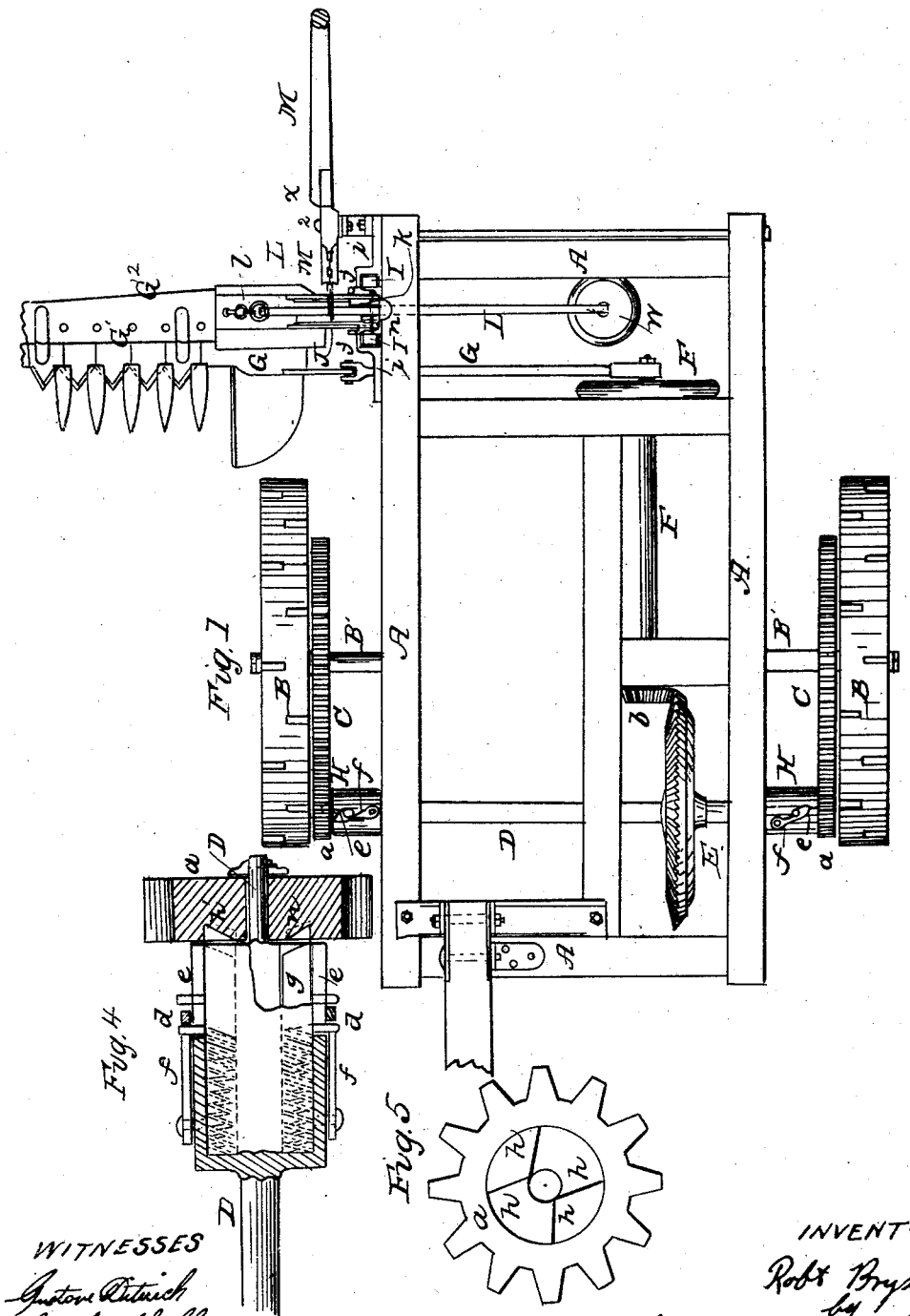
WITNESSES
INVENTOR

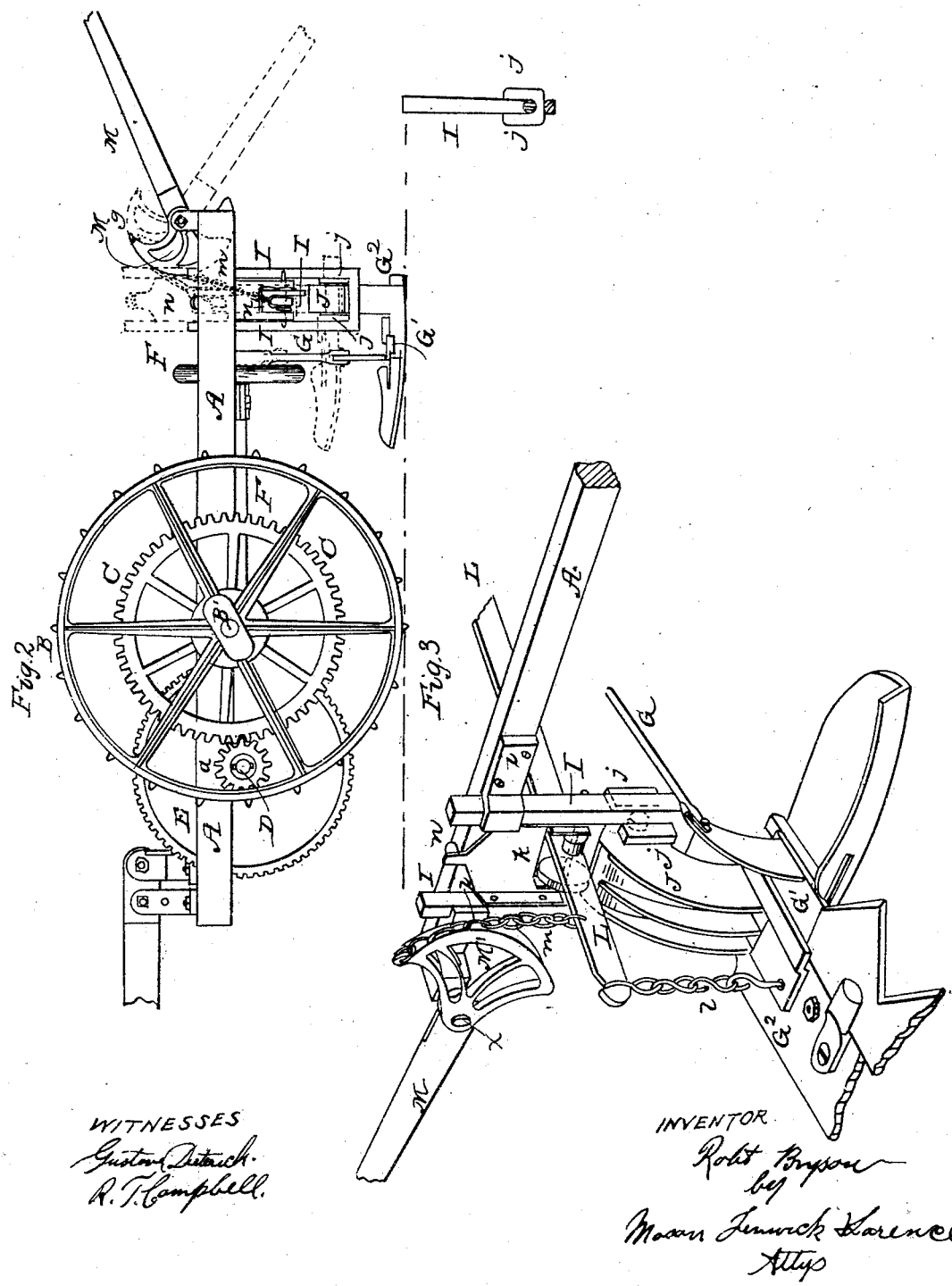

UNITED STATES PATENT OFFICE.

ROBERT BRYSON, OF SCHENECTADY, NEW YORK.

IMPROVEMENT IN HARVESTERS.

Specification forming part of Letters Patent No. 38,030, dated March 31, 1863.

*To all whom it may concern:*

Be it known that I, ROBERT BRYSON, of Schenectady, in the county of Schenectady and State of New York, have invented certain new and useful Improvements in Harvesting-Machines; and I do hereby declare that the following is a full, clear, and exact description thereof, reference being had to the accompanying drawings, making a part of this specification, and to the letters of reference marked thereon, in which—

Figure 1 is a plan view of a harvesting-machine having my improvements applied thereto. Fig. 2 is a side elevation of Fig. 1, showing the cutting apparatus in two positions. Fig. 3, Sheet 2, is an enlarged perspective view, showing in detail the manner of raising and depressing the cutting apparatus. Fig. 4, Sheet 2, is a longitudinal diametrical section through one of the spring-latch boxes and its pinion spur-wheel, showing the angular beveled latches in two positions. Fig. 5, Sheet 2, shows the inclined depressions which are made in the surface of a pinion spur-wheel for receiving the angular ends of the latches of Fig. 4.

Similar letters of reference indicate corresponding parts in the several figures.

My present invention relates to certain new and useful improvements on the patent granted to me June 5, 1860, and also to the patent which was granted to myself and John De Lancy Watkins, dated July 23, 1861, wherein the cutting apparatus is capable of being raised or depressed while the machine is in operation, and also wherein the cutting apparatus is automatically thrown out of and into gear with the traction-wheels, respectively, in the back and forward motions of the machine.

The nature of this invention and improvement, as aforesaid, consists, first, in so balancing and pivoting the cutting apparatus to a vertically-sliding stirrup that the cutting apparatus may be raised or depressed bodily in as nearly a horizontal plane as may be found desirable, at the same time allowing of the usual swinging motions common to the cutting apparatus for raising it out of the way in transporting the machine from one place to another, all as will be hereinafter described; secondly, in the employment of one or more friction-rollers pivoted to the vertical sliding stirrup in such a relation to the rounded head of the pivoted swinging bracket which carries the cutting apparatus as to serve as an upward anti-friction bearing for this bracket, and thus allow the cutting apparatus to be raised with great ease, as will be hereinafter shown and described; thirdly, in the employment of peculiarly-shaped spring-catches in conjunction with beveled notches or depressions made in the sides of pinion spur-wheels, as will be hereinafter described and represented, when the same are arranged on an independent driving-shaft and operate automatically upon said pinion-wheels for the purpose of stopping the motion of the sickle when the machine is backed, and bringing the sickle into operation again when the machine is moved forward, as will be hereinafter described.

To enable others skilled in the art to fully understand my invention, I will proceed to describe its construction and operation.

A is the main frame of the machine, which is of a quadrangular shape, bolted and braced in the usual manner.

B B are two large traction-wheels, upon the axles B' B' of which the frame A is mounted. The axles B' B' are rigidly secured to each side of frame A; but they do not extend across this frame.

C C are two large spur-wheels, which are respectively keyed fast to the axles B' B' of wheels B B, and which drive the transverse shaft D, when the machine is drawn forward, by engaging with the teeth of pinion spur-wheels *a a*, (shown in Fig. 1 of the drawings;) but when the machine is moved backward, the large spur-wheels C C do not actuate the shaft D, in consequence of wheels *a a* turning loosely on their shaft when they are rotated backward. The device which is employed to effect this operation of shaft D forms a part of my invention, and will be fully described hereinafter.

A large beveled-gear wheel, E, is keyed to the shaft D, and engages with a pinion gear-wheel, *b*, which is keyed on the end of a short longitudinal shaft, F. Shaft F extends toward the rear of frame A and carries on its rear end a crank-wheel, F', to which latter a connecting-rod, G, is pivoted, which is again pivoted at its opposite end to a standard projecting up from the sickle-bar G'. Thus it will be seen that the rotary motion of the traction-wheels B B will transmit a reciprocating motion to the sickle when the machine advances upon the standing grain.

The spur-pinions $a\ a$ are put loosely upon the ends of transverse shaft D, and they are kept in their places against their respective hubs H H by means of washers and key-pins in the usual manner of keeping wheels upon the ends of their shafts. The enlarged cylindrical hubs H H are rigidly secured to the shaft D outside of the longitudinal bars of frame A, and these hubs turn with their shaft. Each hub has two longitudinal holes formed in it, which holes are near the circumference of the hub, diametrically opposite each other, and extend into the hub far enough to receive spiral or other suitable springs, $c\ c$, which are shown in Fig. 4 of Sheet 2, and also catch-bolts $g\ g$ which carry each one a pin, $d$, that projects through a longitudinal slot, $e$, and which may be caught and held by the pivoted hooks $f$, or any other such device equivalent thereto. The tendency of springs $c\ c$ is to thrust the latches $g\ g$ outward, and thus these springs $c\ c$ keep the ends of the latches with some degree of force in contact with the beveled or inclined faces of the depressions, $h\ h$, which are made into the inside surfaces of each one of the pinion spur-wheels $a\ a$. These depressions $h\ h$ in wheels $a\ a$ are clearly shown in Figs. 4 and 5 of Sheet 2, and it will be seen in these figures that each depression, there being four shown, has one inclined surface terminating abruptly near the circumference of the bases of the teeth of the wheel. Thus the edges or ends of the latches $g\ g$ are beveled inward or toward the axis of shaft D, so that these ends will correspond with the inclined surfaces of the depressions $h\ h$ in wheels $a\ a$, as above mentioned. Latches $h\ h$ are also beveled in the opposite direction, resembling the "nose" on the latch of a door, so that they will allow the spur-wheels $a\ a$ to turn loosely on their shaft when these wheels are rotated backward.

Now, it will be seen from this description of my angular latches, and their corresponding depressions in the sides of the two spur-pinions $a\ a$, that when the machine is backed these latches will spring back and allow the pinions $a\ a$ to turn loosely on their shaft D without rotating this shaft, and that when the machine is drawn forward the latches will instantly be caught by the notches or depressions $h\ h$, and thus fix the wheels $a\ a$ to the shaft, when motion will be communicated to the sickle-bar G'. The hooks $f\ f$ on the hubs H H are used to hold back the latches $h\ h$, and thus throw them out of action when it is desired to move the machine without moving the sickle.

The second part of my invention relates to an improvement in operating, hanging, and balancing the cutting apparatus, so that said cutting apparatus may be raised or depressed in a horizontal plane, and with very little expenditure of force on the part of the attendant.

I I are two vertical rods forming a sliding stirrup. Rods I I are kept in their places by means of the guide-jaws $i\ i$, which are bolted securely to the right-hand side of and near the rear end of frame A. The stirrup has a free perpendicular play, and near the lower end of this stirrup are secured the guide-pieces $j\ j\ j\ j$, which form two perpendicular grooves for the reception of short pivots which project from the sides of a swinging bracket, J, as shown in Figs. 1, 2, and 3 of the drawings in dotted lines. This pivot-connection of the bracket J to the stirrup I I allows the former to have two motions—viz., an up-and-down motion of the pivots between the guides $j\ j\ j\ j$, and also the usual swinging motion, the pivot being the center thereof. The cutting apparatus is rigidly secured to the opposite or outer end of this stirrup in the usual manner.

Immediately above the pivots of the stirrup I I is a friction-roller, $k$, and upon the axle carrying this roller is a long lever, L, which has its fulcrum on this axle. The long arm of lever L carries on its end a weight, W, (shown in Fig. 1 of the drawings,) and the short arm of this lever is attached by means of a chain, $l$, to the finger-bar $G^2$, so that by adjusting the weight W on the opposite end of lever L the cutting apparatus may be nicely balanced.

M is a lever which carries a grooved-edge quadrant, M', on its forward end. Lever M is pivoted to the rear end of frame A at $x$, and attached to the upper extremity of quadrant M' is a chain, $m$, the lower end of which is again attached to the balancing-lever L, as shown in Figs. 1, 2, and 3 of the drawings, at a point between the fulcrum and the extreme end of the short arm. The stirrup-rods I I are prevented from falling down out of their guides $i\ i$ by the employment of the stop-pin $n$, which projects out from a plate, $n'$, that is secured between the stirrup-rods, as shown in Fig. 3 of the drawings.

Now, from this description it will be seen that I am enabled to so nicely balance the cutting apparatus that the same may be raised or depressed by means of a lever having its chain attached very near to the side of the frame of the machine; and it will also be seen that by the employment of the loaded lever in this connection very little expenditure of power will be required to raise or to depress this cutting apparatus. The friction-roller $k$ keeps the upper end of bracket J down in its proper place, and relieves this bracket of any friction upon its pivot-connections with the vertically sliding or adjustable bracket J. The stirrup I I works up or down freely between its guides $i\ i$, and allows the cutting apparatus to conform perfectly to the inequalities of the surface of the ground, while the entire cutting apparatus may be raised up sufficiently far to be out of the way of obstructions by simply depressing the long arm of lever M.

I am aware that it is a common thing in harvesting and other machines, where it is desired to throw certain wheel-work alternately into and out of action, to employ spring bolts, latches, and pawls to engage loose toothed wheels with the shafts upon which they turn, and these I do not claim as my invention. Neither do I claim the adjustable stirrup hereinabove described, nor the hanging of a sickle and finger bar to such stirrup; but What I do claim as my invention, and desire to secure by Letters Patent, is—

1. The combination, in a harvester, of the driving-wheels, large spur-wheels C C, driving-shaft, double beveled or angular spring-latches $g\ g$, holdback-pins $d\ d$, slots $e\ e$, hubs H H, depressions $h\ h$, and pinions $a\ a$, for the purpose of throwing into and out of action the sickle of the harvester, as herein described.

2. The combination, of spring-latch boxes H H, constructed as herein described, fixed to a rotating shaft, D, with loose spur-wheels $a\ a$, driving-spurs C C, beveled spur E, its pinion $b$, longitudinal shaft F, crank-wheel F', and connecting-rod G, when the same are arranged in connection with a harvester, and operate substantially as herein described.

3. The employment of the loaded lever L, attached to the sliding stirrup I, and connected to the cutting apparatus so as to enable me to nicely balance and at the same time to allow of the vertical adjustments of the cutting apparatus, substantially as herein set forth.

4. The friction-roller $k$ in the stirrup I I, when placed in such a relation to the rounded head of the pivoted bracket J as to serve as an anti-friction bearing for said bracket, essentially as herein set forth.

5. Attaching the short arm of the lifting-lever M to the balancing-lever L at a point which is between the extreme end of the short arm of this lever and its fulcrum, substantially as herein set forth.

ROBERT BRYSON.

Witnesses:
JAMES HANNAH,
WILLIAM PILLING.